Oct. 1, 1957     R. E. HAYFORD     2,808,023

APPARATUS FOR DEVELOPING ELECTROSTATIC LATENT IMAGE

Filed Jan. 3, 1955

INVENTOR
RICHARD E. HAYFORD
BY Frank A. Steinkilper
ATTORNEY

United States Patent Office

2,808,023
Patented Oct. 1, 1957

2,808,023

APPARATUS FOR DEVELOPING ELECTROSTATIC LATENT IMAGE

Richard E. Hayford, Pittsford, N. Y., assignor to The Haloid Company, Rochester, N. Y., a corporation of New York Application January 3, 1955, Serial No. 479,535

6 Claims. (Cl. 118—637)

This invention relates to a method and apparatus for the development of electrostatic latent images.

In xerography it is usual to form an electrostatic latent image on a surface. One method of doing this is to charge a photoconductive, insulating surface and then dissipate the charge selectively by exposure to a pattern of activating radiation. Other means of forming electrostatic latent images are set forth in U. S. 2,647,464 to James P. Ebert and U. S. 2,576,047 to Roland M. Schaffert. Whether formed by these means or any other, the resulting electrostatic charge pattern is conventionally utilized by the deposition of an electroscopic material thereon through electrostatic attraction whereby there is formed a visible image of electroscopic particles corresponding to the electrostatic latent image. Alternatively, the electrostatic charge pattern may be transferred to an insulating film and the electroscopic particles deposited thereon to form the visible image. In any case, this visible image, in turn, may be transferred to a second surface to form a xerographic print.

The process of depositing the electroscopic powder on the electrostatic image to render the electrostatic image visible is called the "development step" and is one of the most critical steps of the entire process. The step is of particular importance both on machines designed for continuous operation with any type of copy and in processing continuous-tone images. Now, in accordance with the present invention, a method and an apparatus are provided for substantially improved development of an electrostatic latent image.

Fig. 1 of the attached drawings is a block diagram showing the poistion of the development step in an overall xerographic process which results in a visible image.

Figure 1:
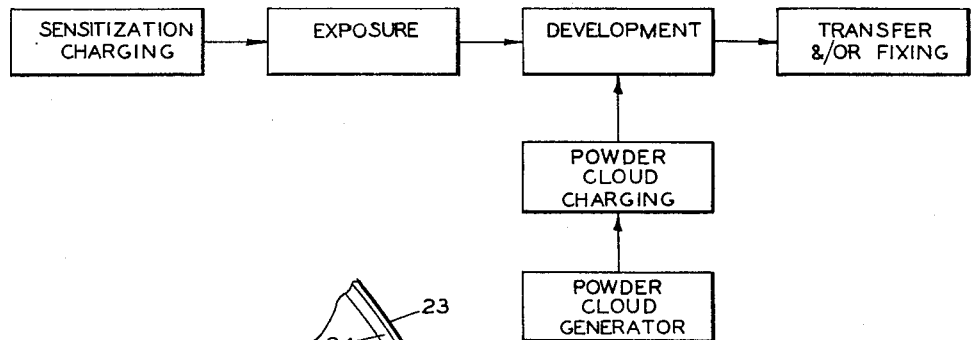

As shown in Fig. 1, the general xerographic process involves the formation of an electrostatic latent image. This is generally, although not always, preceded by a treatment to sensitize the surface on which the electrostatic image is to be formed. The electrostatic latent image to be useful must then be rendered visible, which is done in a development step. This is accomplished by depositing electroscopic particles either on the surface on which the image was formed or on an insulating surface to which the electrostatic latent image has been transferred.

It is evident that no picture can be better than its development step permits. About the coarsest type of image reproduced by a xerographic process requires a resolution of at least about 50 lines per inch. Commercial, linecopying machines generally have a resolution power of about 5 to 10 lines per millimeter. The process used in obtaining this resolution is set forth in U. S. 2,618,552 and involves the use of a finely-divided, colored material called a "toner" deposited on a slightly more coarsely divided material called a "carrier." This two-component developer is cascaded across the electrostatic latent image areas. The control of the concentration of toner in the two-component developer becomes extremely difficult in the continuous operation of such line copy machines. When applied to continuous-tone development where resolutions of about 50 or more lines per millimeter are often desired, it has been found impossible to obtain this high quality of reproduction using such a system. Accordingly, a system known as "powder cloud development" is preferred. This is the system incorporated in Fig. 1.

As shown in Fig. 1, a powder cloud is generated. The cloud so produced is then charged, the charging step constituting either a separate step, or utilizing the inherent charge on the cloud in the case of a cloud of dry particles. A cloud so generated and charged is then contacted with the electrostatic latent image in the development step. The visible image so produced may be used as such, permanently affixed to the plate, or may be transferred to another material as a sheet of paper or plastic, as is well-known to those skilled in the xerographic art.

While it is possible to obtain a high quality of tonal reproduction using powder cloud development, unfortunately, some of the characteristics of this type of development make it difficult to adapt to such uses as continuous processing. For instance, for an automatic camera with a processing cycle of only 15 seconds, the actual development of the image on the plate probably should not take more than 2 or 3 seconds, and 1 second would be preferable. Another problem in powder cloud development is the elimination or control of the deposition of powder in places other than on actual image areas, particularly in the areas between where the cloud is initially generated and where it is finally admitted to the development zone. Another problem is that of obtaining uniform development over the entire area of the plate. Now, in accordance with the instant invention, a method and an apparatus are provided for substantially improved development of an electrostatic image. Using the process and apparatus of the present invention, high quality of tonal reproduction is obtained while solving the problem of unwanted deposition of powder in the intermediate areas between where the cloud is generated and where it is finally admitted to the development zone. The process of the present invention also greatly reduces graininess in the resulting developed image.

According to the present invention, an electrostatic image is developed by drawing the field of force of the image externally above the image-bearing surface. Then, a cloud of electroscopic particles is generated and charged to a polarity opposite to the polarity of the electrostatic image. The charged cloud is passed into a manifold block and additional air added to the powder cloud at the point of addition to the manifold block. The direction of flow of the thus-augmented powder cloud is changed to a direction making an angle approximately about 90° with the previous direction of flow, although the exact angle is far from critical. Additional air is added to the augmented powder cloud at the point of change of direction and the additional air and the powder cloud mixed to produce a relatively uniform powder cloud which is then passed along the image-bearing surface within the field of force in approximately laminar flow. The electroscopic particles are deposited on the image-bearing member thereby forming a visible, or developed, image corresponding faithfully to the electrostatic image. Such a developed image is characterized by having a resolution of at least about 50 lines per inch, and may have a resolution of about 1,200 or more lines per inch.

This visible powder image then is used by further steps of the xerographic process, as, for example, by transfer, fixing or other means, to yield a xerographic print or to yield other useful forms of the electrophotographic image.

The electrostatic image is drawn externally from the image-bearing member by means of a development electrode. The area between the image-bearing member and the development electrode is called the "development zone" and can be no more than about ⅛" thick, and for good photographic reproductions should be less than 1/40". For practical development, the width of the development zone should equal one dimension of the image-bearing surface.

Apparatus for developing an electrostatic image according to this process comprises, then, a cloud generator, a charging device for the cloud particles, a development electrode, support means to receive and support an electrostatic image-bearing member adjacent to the development electrode and closely spaced therefrom, thereby defining a development zone relative to the development electrode, a manifold block having a manifold floor the exit slot of which constitutes an entrance slot to the development zone, a feed slot intersecting the manifold floor at an angle approximately about 90°, means to feed the charged cloud particles into the feed slot, means to feed air to the feed slot at a point no closer to the manifold floor than the point where the cloud particles enter the feed slot, and means to feed air to the manifold floor at a point no closer to the entrance slot than the point where the feed slot intersects the manifold floor.

In generating the cloud of electroscopic particles, any device known to those skilled in the art may be used, for example, agitation of a powder mass in a closed container with a rotating brush, as in U. S. 2,357,809 to C. F. Carlson, or a rotating air mass as caused by laterally-located nozzles. Similarly, any charging device known to those skilled in the art may be used to charge the cloud particles, such as a corona or triboelectric charging. The use of capillary tubes to feed powder directly from the generator to the manifold is a preferred embodiment of the invention as it assures the turbulent flow of the powder materials, thereby helping to de-agglomerate the powder particles, and simultaneously charges them to the desired voltage through the triboelectric contact of the powder particles with the walls of the capillary.

The general nature of the invention having been shown, a specific embodiment of the invention will now be described.

Figure 2:
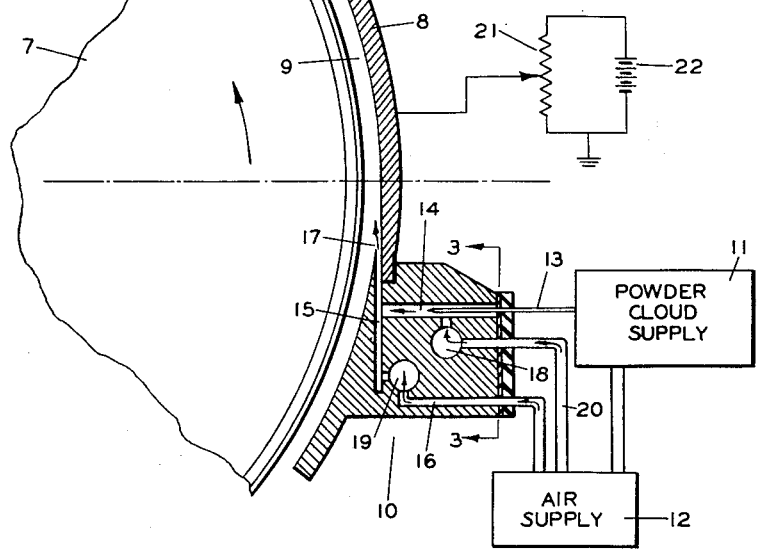
Fig. 2 is a diagrammatic side elevation in cross section of apparatus according to one embodiment of the invention.

In Fig. 2, 7 is the image-bearing member, 8 is the development electrode, 9 is the development zone, 10 is the manifold block, 11 is the powder cloud supply, 12 is the air supply. The image-bearing member 7 shown in Fig. 2 consists of an aluminum drum 24 coated on its curved surface with selenium as the photoconductive insulating layer 23. The drum is rotatably mounted on its lengthwise axis and the various steps of the overall xerographic process—charging, exposure, development, and transfer—as shown in Fig. 1 are carried out around the circumference of the drum and the drum rotated to move the image from one step to the next.

As shown in the drawing, the powder cloud supply 11 feeds the powder cloud through capillary tubes 13 to the feed slot 14 in the manifold block 10 where additional air from tube 20 is mixed with the powder cloud in the feed slot. The feed slot, in turn, carries the powder cloud now containing additional air to the manifold floor 15 where additional air from the tube 16 is again added to the powder cloud and the resulting powder cloud admitted to the development zone from the manifold block through the entrance slot 17 in approximately laminar flow. The chambers 18 and 19 are expansion chambers which act as reservoirs for the additional air thereby helping to smooth out any fluctuations in pressure in the air supply and assure the same amount of flow from each supplementary air duct.

Where the electrostatic image is borne by a photoconductive insulating layer coated on a conductive backing as in the embodiment shown in Fig. 2, desirable means are provided for applying an electric potential difference between the backing member 24 for the photoconductive insulating layer 23 and the development electrode 8. These means may include, for example, a battery 22 or similar D. C. power source connected through a potentiometer 21 to the development electrode. The conductive backing member 24 in such a system is grounded (not shown). Generally the powder cloud is charged with a charge of polarity opposite to the polarity of the electrostatic image. However, this is not necessarily so. Thus, reversal development may be effected by charging the powder cloud with a charge having the same polarity as the image areas. Hence, the powder is repelled from the image. Reversal development may also be obtained by use of the proper bias from potentiometer 21 to electrode 8. In this system the potentiometer is adjusted to bias the electrode 8 to the highest voltage on the photoconductive insulating layer 23 and of the same polarity as the electrostatic image. The field applied by the development electrode opposes the image field, the powder (charged to a polarity opposite to that to which the photoconductive insulating layer was initially charged) is attracted to the uncharged "background" areas to develop a reversal print.

In the apparatus of the instant invention two dimensions are critical. The first is the thickness of the development zone; i. e. the distance from the image-bearing surface to the development electrode. This distance should be no more than about ⅛" in order to effectively draw the field of force of the image externally from the image-bearing surface. The second is the thickness of the manifold floor 15, which should be from about 0.020" to about 0.080". The distance between the junction of the powder cloud feed slot 14 and the manifold floor 15 and the entrance slot 17 should be sufficient for smoothing the flow from the relatively intense jets to a laterally uniform flow into the development zone 9. In practice this has been found to be at least one inch, though many factors, particularly the speed of the powder cloud, will cause this to vary somewhat. The distance between where the capillaries 13 feed the powder cloud into the feed slot 14 and the manifold floor 15 is not at all critical, though for purposes of compactness it is kept small. The second supplementary air system (16 in Fig. 2) may enter the manifold floor at any desired angle so long as it provides an air stream moving toward the development zone.

Figure 3:
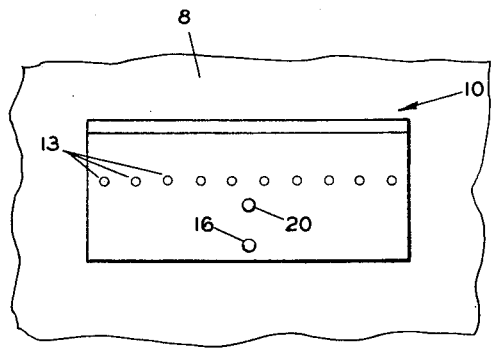
Fig. 3 is an end view of the manifold 10 along the line 3—3 as shown in Fig. 2.

The section in Fig. 3 shows some details of the manifold block more clearly than Fig. 2. In this particular embodiment as shown in Fig. 3, the capillary tubes 13 used to feed the powder cloud to the feed slot were each about 0.020" internal diameter and were positioned in the feed slot with about ½" between centers. Referring now to Fig. 2, the feed slot entered the manifold floor at a distance of about 1" from the entrance slot to the development zone. This distance was sufficient to assure proper mingling of the air added to the manifold floor with the powder cloud so as to aid in the uniformity of development. The particular apparatus shown was specifically designed for use on a continuous machine developing an image area about 5" wide.

The apparatus shown is merely descriptive of the general invention, which is not limited to this specific embodiment; in fact, many variations of this embodiment will immediately be evident to those skilled in the art. Thus, the image-bearing member and the development electrode may be curved to fit on a drum for continuous operation, as shown, or they may be in the shape of flat members. The image-bearing member itself may be either in the shape of a rigid plate or in a flexible film. An electrical potential is desirably maintained on the development electrode to permit improved image development. The development apparatus may be positioned within a container of suitable design so as to prevent loss of developer to external areas or merely to improve the appearance of the apparatus.

The air flow may vary widely without affecting picture development adversely. In general, however, the additional air should have about 2 to 10 times the volume flow of the powder cloud at the point of each addition of additional air. Inserting additional air at two distinct positions in the path of flow of the powder cloud as in the instant invention assists in keeping the cloud de-agglomerated, reduces graininess in the developed images, prevents deposition of powder in unwanted areas, reduces streaking and uneven development, and make possible easy and even control of powder cloud density and rate of flow thereby permitting a wide degree of control over development time and print density.

What is claimed is:

1. Apparatus for developing an electrostatic latent image comprising means for creating finely-divided electrostatically charged cloud particles suspended in a gas, a development electrode and support means to receive and support an electrostatic image-bearing member adjacent to the development electrode and closely spaced therefrom thereby defining a development zone relative to said development electrode, a manifold block having a manifold floor the exit slot of which constitutes an entrance slot to the said development zone whereby said charged cloud particles enter said zone approximately parallel to said image-bearing member, a feed slot intersecting said manifold floor at an angle approximately about 90°, means to feed charged cloud particles into said feed slot, means to feed air to said feed slot at a point no closer to said manifold floor than the point where said cloud particles enter said feed slot, and means to feed air to said manifold floor at a point no closer to said entrance slot than the point where said feed slot intersects said manifold floor.

2. Apparatus for developing an electrostatic latent image comprising means for creating finely-divided cloud particles suspended in a gas, a development electrode and support means to receive and support an electrostatic image-bearing member adjacent to the development electrode and closely spaced therefrom thereby defining a development zone relative to said development electrode, a manifold block having a manifold floor the exit slot of which constitutes an entrance slot to the said development zone whereby said cloud particles enter said zone approximately parallel to said image-bearing member, a feed slot intersecting said manifold floor at an angle approximately about 90°, capillary tubes to triboelectrically charge and feed said cloud particles into said feed slot, means to feed air to said feed slot at a point no closer to said manifold floor than the point where said capillary tubes discharge into said feed slot and means to feed air to said manifold floor at a point no closer to said entrance slot than the point where said feed slot intersects said manifold floor.

3. Apparatus for developing an electrostatic latent image comprising means for creating finely-divided electrostatically charged cloud particles suspended in a gas, a development electrode and support means to receive and support an electrostatic image-bearing member at no more than 1/8" from the development electrode thereby defining a development zone relative to said development electrode no more than 1/8" thick, a manifold block having a manifold floor the exit slot of which constitutes an entrane slot to the said development zone whereby said charged cloud particles enter said zone approximately parallel to said image-bearing member, a feed slot intersecting said manifold floor at an angle approximately about 90°, means to feed charged cloud particles into said feed slot, means to feed air to said feed slot at a point no closer to said manifold floor than the point where said cloud particles enter said feed slot, and means to feed air to said manifold floor at a point no closer to said entrance slot than the point where said feed slot intersects said manifold floor.

4. Apparatus for developing an electrostatic latent image comprising means for creating finely-divided electrostatically charged cloud particles suspended in a gas, a development electrode and support means to receive and support an electrostatic image-bearing member adjacent to the development electrode and closely spaced therefrom thereby defining a development zone relative to said development electrode, a manifold block having a manifold floor the exit slot of which constitutes an entrance slot to the said development zone whereby said charged cloud particles enter said zone approximately parallel to said image-bearing member, said manifold floor being from about 0.020" to about 0.080" thick, a feed slot intersecting said manifold floor at an angle approximately about 90°, means to feed charged cloud particles into said feed slot, means to feed air to said feed slot at a point no closer to said manifold floor than the point where said cloud particles enter said feed slot, and means to feed air to said manifold floor at a point no closer to said entrance slot than the point where said feed slot intersects said manifold floor.

5. Apparatus for developing an electrostatic latent image comprising means for creating finely-divided electrostatically charged cloud particles suspended in a gas, a development electrode and support means to receive and support an electrostatic image-bearing member adjacent to the development electrode and closely spaced therefrom thereby defining a development zone relative to said development electrode, a manifold block having a manifold floor the exit slot of which constitutes an entrance slot to the said development zone whereby said charged cloud particles enter said zone approximately parallel to said image-bearing member, a feed slot intersecting said manifold floor and approximately perpendicular thereto, means to feed charged cloud particles into said feed slot, means to feed air to said feed slot at a point no closer to said manifold floor than the point where said cloud particles enter said feed slot, and means to feed air to said manifold floor at a point no closer to said entrance slot than the point where said feed slot intersects said manifold floor.

6. Apparatus for developing an electrostatic latent image comprising means for creating finely-divided electrostatically charged cloud particles suspended in a gas, a cylindrical drum having coated thereon a photoconductive insulating layer, a development electrode along one segment around the drum and closely spaced from the surface of the drum thereby defining a development zone relative to said photoconductive insulating layer, means to move said photoconductive insulating layer relative to said development electrode, a manifold block having a manifold floor the exit slot of which constitutes an entrance slot to the said development zone whereby said charged cloud particles enter said zone approximately tangentially to said drum surface, a feed slot intersecting said manifold floor at an angle approximately about 90°, means to feed charged cloud particles into said feed slot, means to feed air to said feed slot at a point no closer to said manifold floor than the point where said cloud particles enter said feed slot, and means to feed air to said manifold floor at a point no closer to said entrance slot than the point where said feed slot intersects said manifold floor.

References Cited in the file of this patent
UNITED STATES PATENTS

| | | |
|---|---|---|
| 2,097,233 | Meston | Oct. 26, 1937 |
| 2,573,881 | Walkup et al. | Nov. 6, 1951 |
| 2,577,894 | Jacob | Dec. 11, 1951 |
| 2,624,652 | Carlson | Jan. 6, 1953 |
| 2,691,345 | Huebner | Oct. 12, 1954 |